United States Patent
Aiken

(12) 
(10) Patent No.: US 6,781,313 B2
(45) Date of Patent: *Aug. 24, 2004

(54) TUBULAR CAPACITOR FOR USE IN AN ELECTRON BEAM TUBE

(75) Inventor: Steven Aiken, Chelmsford (GB)

(73) Assignee: Marconi Applied Technologies Limited, Essex (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/481,446

(22) Filed: Jan. 13, 2000

(65) Prior Publication Data

US 2002/0030447 A1 Mar. 14, 2002

(51) Int. Cl.$^7$ ................................................ H01J 25/04
(52) U.S. Cl. ...................................... 315/5.37; 361/303
(58) Field of Search .................... 315/5, 5.37; 361/303, 361/306.1

(56) References Cited

U.S. PATENT DOCUMENTS

| | | | |
|---|---|---|---|
| 4,306,272 A | 12/1981 | Little | ........................... 361/303 |
| 4,335,297 A | 6/1982 | Little | .................. 315/111.21 X |
| 5,536,992 A | * 7/1996 | Crompton | ............... 315/5.37 X |
| 5,990,621 A | * 11/1999 | Sobieradzki | .................... 315/5 |

FOREIGN PATENT DOCUMENTS

| | | |
|---|---|---|
| EP | 0 013 952 | 6/1980 |
| GB | 1 213 892 | 11/1970 |
| GB | 2 203 245 | 2/1997 |

* cited by examiner

Primary Examiner—Benny T. Lee
(74) Attorney, Agent, or Firm—Venable, LLP; Robert Kinberg; Catherine M. Voorhees

(57) ABSTRACT

A capacitor includes a conductive tube, covered by insulating material and a layer of conductive material located at the central part of the tube. The geometry presents a low inherent inductance and a continuous, distributed conductance. The capacitor may be used as a bypass capacitor in an IOT amplifier to reduce stray and leakage high frequency radiation, in one amplifier being located within the inner wall of an annular input cavity.

26 Claims, 4 Drawing Sheets

TUBULAR CAPACITOR FOR USE IN AN ELECTRON BEAM TUBE

FIELD OF THE INVENTION

This invention relates to a capacitor and more particularly, but not exclusively, to a bypass capacitor for use in an inductive output tube (IOT).

BACKGROUND TO THE INVENTION

IOTs are electron beam tube devices used, for example, to amplify high frequency signals for TV broadcasting and require voltages in the region of some tens of kilovolts for this operation.

SUMMARY OF THE INVENTION

According to the present invention, there is provided a capacitor comprising an electrically conductive tube, a layer of insulating material on the outer surface of the tube and electrically conductive material on the insulating material.

The geometry of a capacitor in accordance with the invention leads to a device having an inherently low inductance and also provides a continuous, distributed capacitance, making the capacitor particularly suitable for use as a bypass capacitor in high frequency electron beam tubes such as IOT amplifiers. This gives an improvement, for example, in sideband performance when used in digital television applications.

In a particularly advantageous embodiment of the invention, the tube provides support for the layer and the conductive material. As the tube acts as a substrate, neither the layer nor conductive material need be self-supporting. Advantageously, the insulating material has a greater length in the longitudinal axial direction of the tube than the electrically conductive material. Thus, the electrical path length between the tube and the conductive material may be made relatively long, providing good voltage hold-off.

Preferably, the insulating material covers substantially the whole of the outer surface of the tube. It may be applied for example by dip coating or in any other suitable way for the materials involved. One insulating material of particular suitability for the capacitor is Kapton (Trade Name) but other high dielectric constant insulator materials may be used. The Kapton may be applied as one or more layers on the outer surface of the tube or may be dip coated. The conductive material may be laid down on the insulating material by spraying, for example, or in another arrangement may be a metal foil wrapped around it.

Preferably the tube, insulating material and conductive material are arranged in a circularly symmetrical geometry about the longitudinal axis of the tube to minimize inductance. In one preferred arrangement, the length of the tube is at least twice its diameter.

The tube, being hollow, may if necessary surround electrical leads or other components of a device.

Advantageously, an electrical connector is included which is connected to the conductive material at substantially the mid-point of the axial extent of the conductive material. The connector may be substantially annular, making a connection with the conductive material around the inner periphery of the connector, again leading to low inductance. The connector may be an annular member arranged extensive in a plane normal to the longitudinal axis. In one embodiment, the connector includes apertures therein by which, for example, cooling air may be directed to other components of a device to which it is connected. The connector may include a mesh. The mesh may form only a part of the connector to provide a fluid path or it may make up a more substantial amount of the connector. For example, the connector may consist of a mesh arranged about a frame. The apertured or mesh configuration of the connector also give a reduction in weight which may be desirable in some uses.

In one embodiment the connector is electrically connected to the conductive material via a plurality of spring fingers. Similarly, the connector may also have a plurality of spring fingers around its outer periphery by which it makes electrical connection with a surrounding conductive member. The fingers provide good electrical connection but also permit the position of the connector to be adjusted readily. The connector may be supported by a separate electrically insulating support on which it is mounted.

A capacitor in accordance with the invention is particularly suitable for use where it is required to hold off high voltages, on the order of several tens of kilovolts. In one typical arrangement, the tube of the capacitor is maintained at 35 kV and the conductive material at ground potential during operation of a device to which it is connected.

According to a feature of the invention, an electron beam tube comprises an electron gun having a cathode and a capacitor in accordance with the invention connected as a bypass capacitor to short circuit stray and leakage high frequency power. The tube of the capacitor is preferably connected to cathode potential. Where the electron beam tube is combined with an annular input resonant cavity as in an IOT amplifier, the capacitor may conveniently be located in the volume surrounded by the inner wall of the cavity and substantially parallel thereto. The conductive material of the capacitor may be electrically connected to the inner wall.

BRIEF DESCRIPTION OF DRAWINGS

One way in which the invention may be performed is now described by way of example with reference to the accompanying drawings in which.

DESCRIPTION OF A PREFERRED EMBODIMENT

Figure 1:
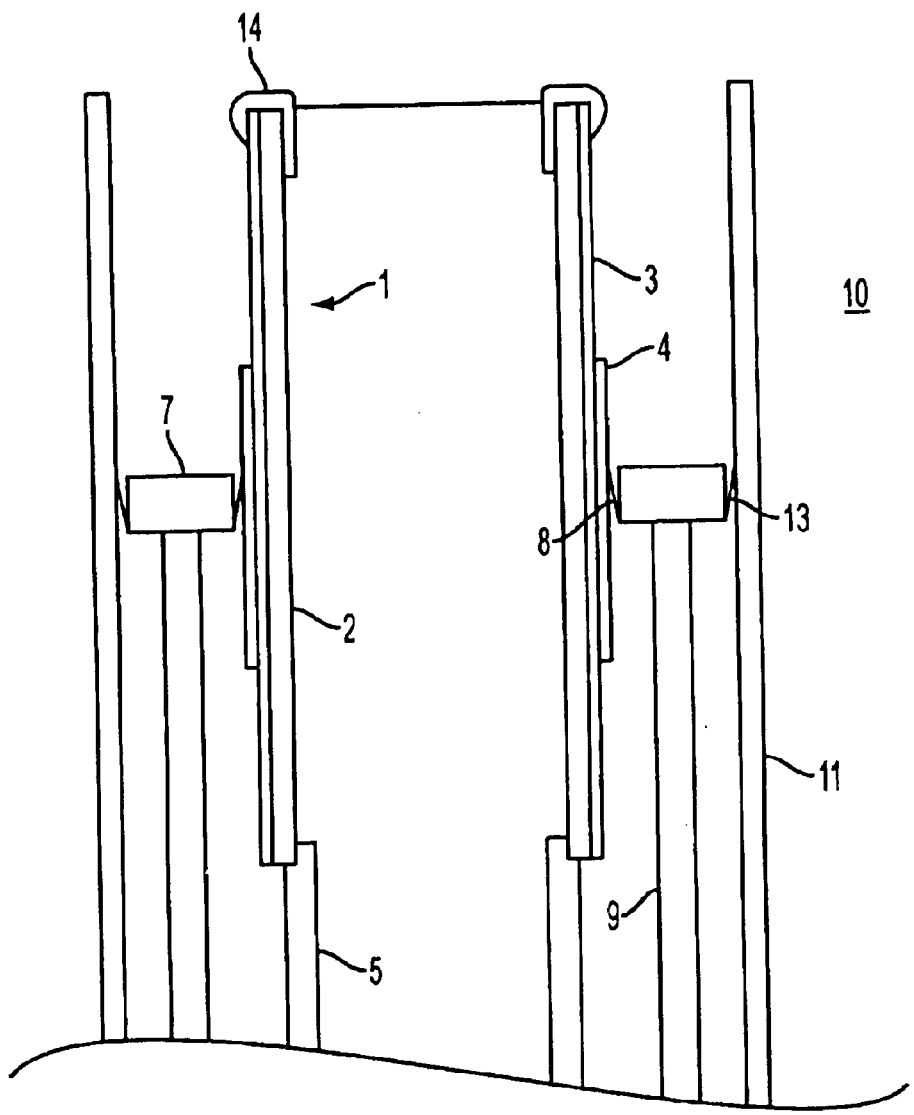
FIG. 1 schematically shows a capacitor in accordance with the invention and included in an IOT.
Figure 2:
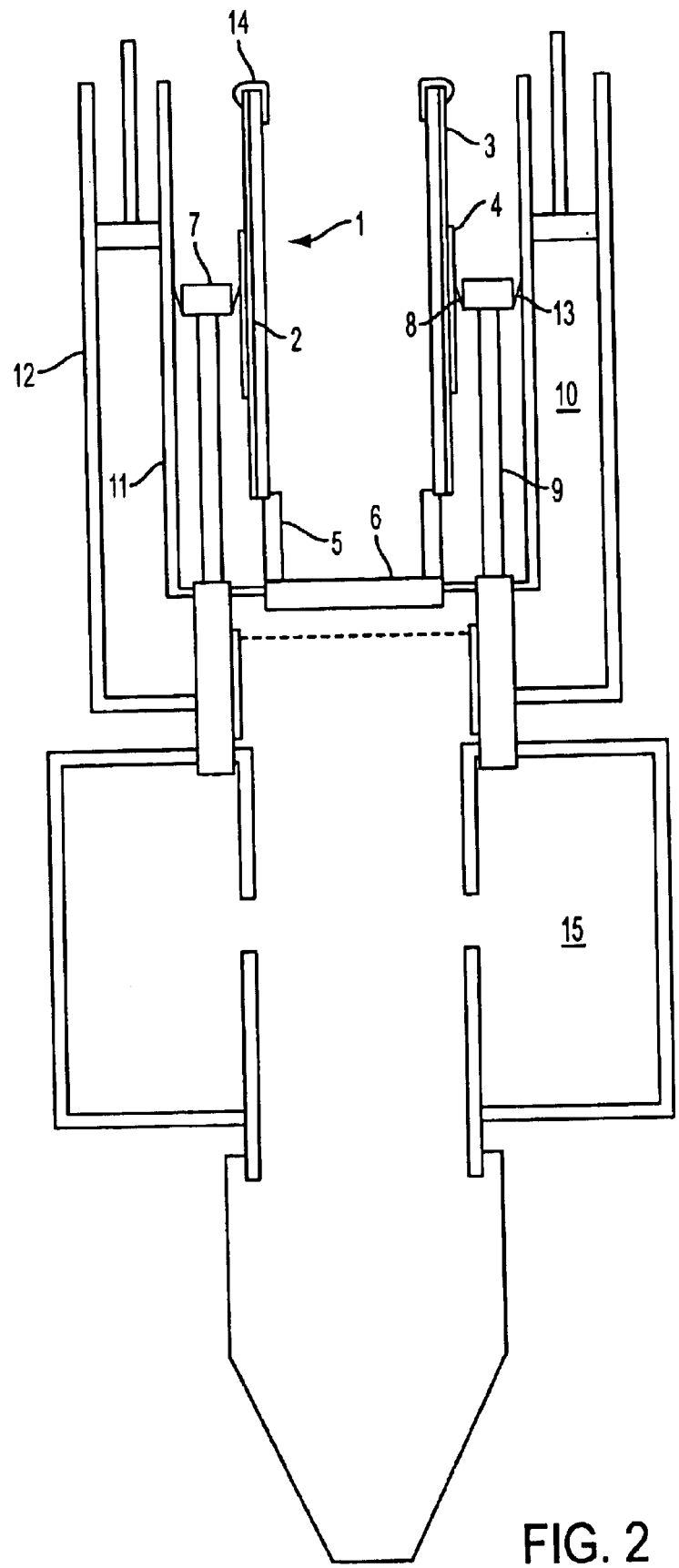
FIG. 2 schematically shows the IOT of which that shown in FIG. 1 is a part.
Figure 3:
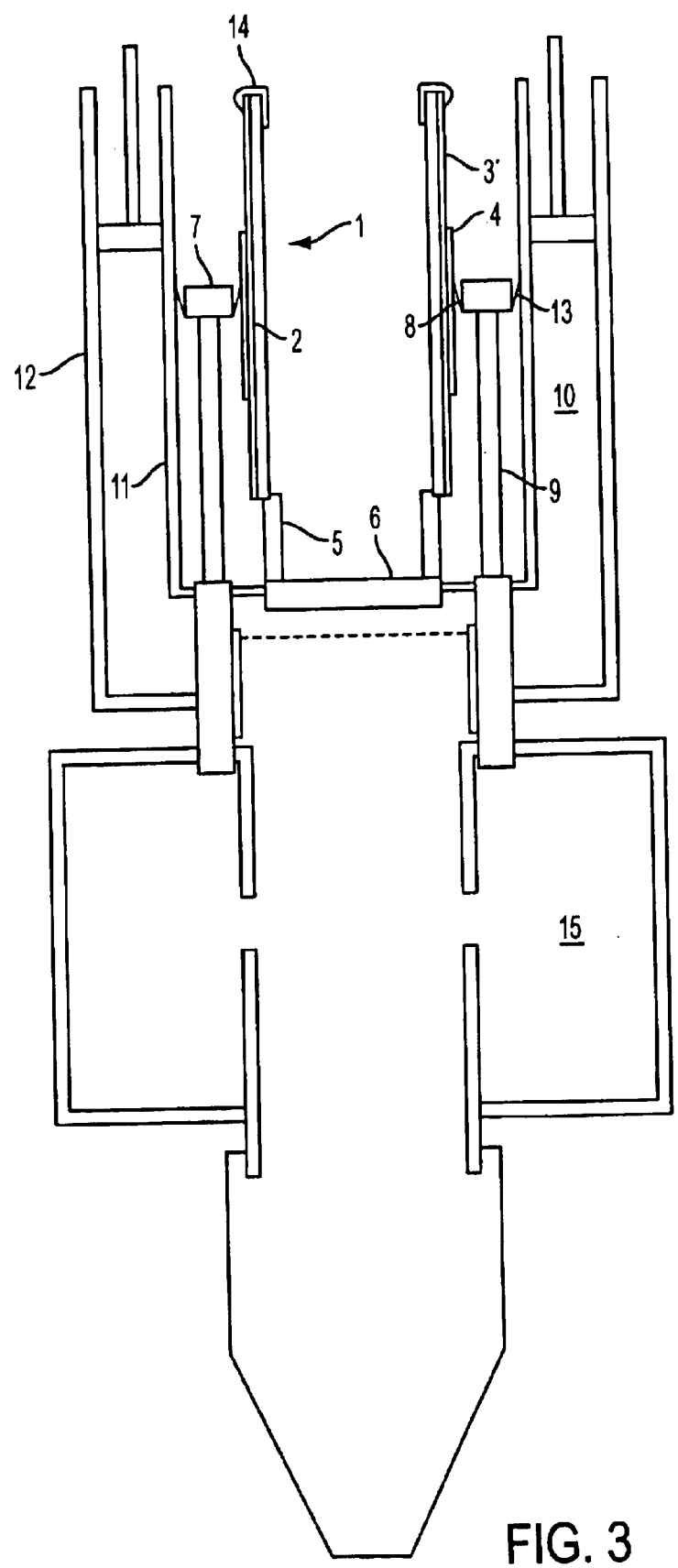
FIG. 3 schematically shows a capacitor with the polyimide film or Kapton dip coated onto the tube.

With reference to FIGS. 1 and 2, a capacitor 1 included in an inductive output tube amplifier includes a cylindrical hollow aluminum tube 2 having a length which is almost three times its diameter. The outer surface of the aluminum tube 2 is covered by three layers of insulating material, such as a polyimide film (Kapton) 3 at the mid-point in the axial direction of the tube 2, and a band of metal foil 4 is wrapped around the outside of the Kapton film 3. The tube 2 thus acts as a substrate for the Kapton film 3 and metal foil 4. During use, the tube 2 acts as one plate of the capacitor and the foil 4 as the other plate. Alternatively, tube 2 may be dip coating resulting in Kapton coating 3' instead of using Kapton sheets (see FIG. 3).

The aluminum tube 2 is supported at one end by part of a structure 5 which in turn is connected to the cathode 6 of the IOT (see FIG. 2), the support structure 5 being maintained at cathode potential during operation of the RF amplifier.

An annular metallic plate 7 surrounds the tube 2 of the capacitor, being arranged normal to its longitudinal axis. The inner periphery of the annular plate 7 includes a plurality of conductive spring fingers 8 located around its inner circumference. These provide a good electrical connection between the metal foil 4 and the metallic annular plate 7. The plate 7 is supported on an insulating cylinder 9.

The IOT includes an annular input cavity 10 having an inner wall 11 and an outer wall 12. The metallic plate 7 is electrically connected via another plurality of spring fingers 13 arranged equidistantly around its periphery to the inner wall 11 of the input cavity 10. Thus, the metal foil 4 is electrically connected to the inner wall 11 of the input cavity 10 which during use of the amplifier is maintained at ground potential. Typically, cathode potential is 35 kV and thus the insulating layer 3 must reliably hold off a voltage of 35 kV. The end of aluminum tube 2 remote from the cathode support 5 is capped by a cured anti-corona member 14. Alternatively, this could be provided by suitably shaping the end of the tube 2 itself. The spring fingers permit electrical contact to be maintained while the plate 7 is moved in an axial direction. In other variants the plate 7 may be connected to the foil 4 and/or inner wall 11 by a fixed connection if movement is not required.

Figure 4B:
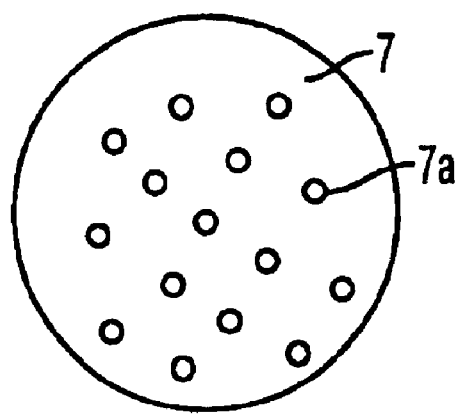
FIGS. 4a and 4b schematically show alternative embodiments of the metallic plate in a top or bottom view.
Figure 4A:
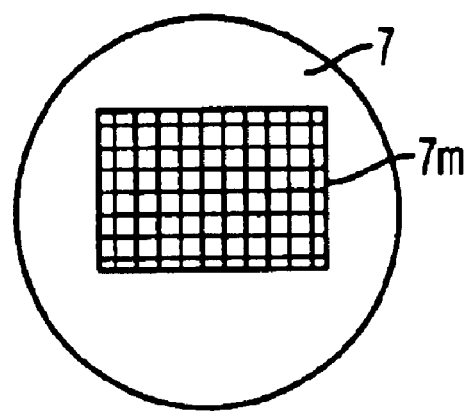

As shown in FIG. 4a, the top and bottom of plate 7 may be apertured with holes 7a to allow cooling air to be flowed over the inner wall 11. Part of the plate 7 also includes a mesh 7m to allow air to pass therethrough (see FIG. 4b).

The plate 7 is apertured to allow cooling air to be flowed over the inner wall 11. Part of the plate also includes a mesh to allow air to pass therethrough.

FIG. 2 shows more the IOT of FIG. 1 including the output cavity 15 from which an amplified high frequency signal is coupled. The capacitor 1 gives a continuous distributed capacitance and has inherently low inductance. It short circuits stray and leakage rf power that may otherwise detrimentally modify the signal to be amplified.

I claim:

1. An electron beam tube comprising an electron gun having a cathode and a capacitor, said capacitor comprising:
   an electrically conductive tube having an outer surface;
   a layer of insulating material on said outer surface of the tube; and
   electrically conductive material on the insulating material wherein said tube provides support for the layer of insulating material and said conductive material.

2. The electrode beam tube as claimed in claim 1, wherein said electrically conductive tube is mechanically connected to said cathode.

3. The electron beam tube as claimed in claim 1, wherein said insulating material has a greater length along a longitudinal axial direction of said tube than said electrically conductive material.

4. The electron beam tube as claimed in claim 1, wherein said insulating material covers substantially the whole of the outer surface of said tube.

5. The electron beam tube as claimed in claim 1, wherein said layer of insulating material comprises a plurality of sheets of said material.

6. The electron beam tube as claimed in claim 1, wherein said insulating material is polyimide film.

7. The electron beam tube as claimed in claim 1, wherein said conductive material is metal foil.

8. The electron beam tube as claimed in claim 1, wherein said tube has a length which is at least twice a diameter of the conductive tube.

9. The electron beam tube as claimed in claim 1, wherein said conductive material extends in an axial direction and is positioned centrally with respect to ends of said tube.

10. The electron beam tube as claimed in claim 1, and including an electrical connector connected to said conductive material at substantially a mid-point of the axial extent of said conductive material.

11. The electron beam tube as claimed in claim 10, wherein said connector is substantially annular and makes a connection with the conductive material around an inner periphery of said connector.

12. The electron beam tube as claimed in claim 11, wherein said connector is an annular member extensive in a plane normal to a longitudinal axis of the annular member.

13. The electron beam tube as claimed in claim 11, wherein said connector is an apertured annular plate.

14. The elctron beam tube as claimed in claim 11, wherein said connector includes a mesh.

15. The electron beam tube as claimed in claim 10, wherein said connector is electrically connected to said conductive material via a plurality of fingers.

16. The electron beam tube as claimed in claim 10, wherein said connector is electrically connected to a wall surrounding said connector via a plurality of fingers.

17. The electron beam tube as claimed in claim 10, and including an electrically insulating support on which said connector is mounted.

18. The electron beam tube as claimed in claim 1, and capable of holding off several tens of kilovolts.

19. The electron beam tube as claimed in claim 1, and comprising anti-corona means at one or both ends of said tube.

20. The electron beam tube as claimed in claim 1, wherein said insulating material is dip coated on said tube.

21. The electron beam tube as claimed in claim 20, wherein the insulating material is polyimide film.

22. The electrode beam tube as claimed in claim 1, wherein said capacitor is a bypass capacitor to short circuit stray and/or leakage high frequency power.

23. The electron beam tube as claimed in claim 22, wherein said tube of said capacitor is connected to cathode potential.

24. The electron beam tube as claimed in claim 22, and including an annular input resonant cavity arranged about the electron gun, said capacitor being located within a volume surrounded by an inner wall of said cavity and substantially parallel thereto.

25. The electron beam tube as claimed in claim 24, wherein said conductive material of said capacitor is electrically connected to said inner wall of said cavity.

26. The electron beam tube as claimed in claim 22, and being an inductive output tube (IOT).

* * * * *